UNITED STATES PATENT OFFICE.

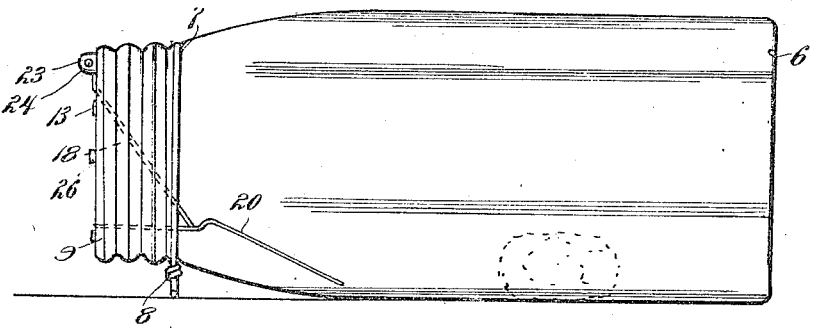
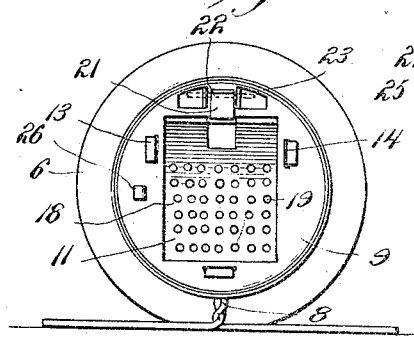
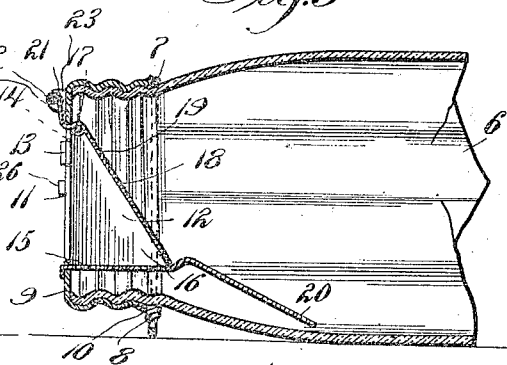
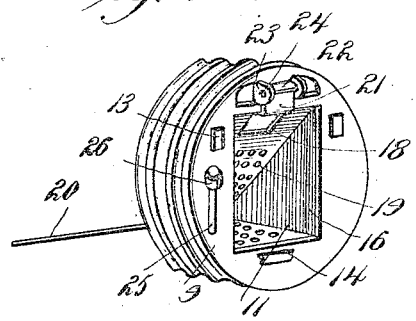
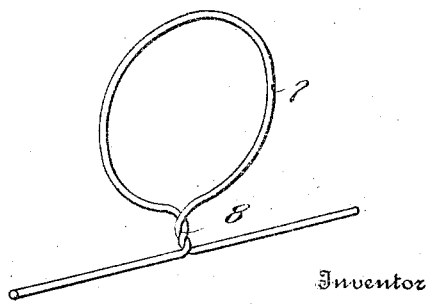

CHARLES HALL, OF DETROIT, MICHIGAN.

ANIMAL-TRAP.

1,063,347.  Specification of Letters Patent.  Patented June 3, 1913.

Application filed March 29, 1912. Serial No. 687,123.

*To all whom it may concern:*

Be it known that I, CHARLES HALL, a citizen of the United States, residing at Detroit, in the county of Wayne and State of Michigan, have invented new and useful Improvements in Animal-Traps, of which the following is a specification.

The general object of this invention is the provision of an animal trap which can be readily constructed from any size of the well known Mason fruit jar, the cover thereof being provided with a novel form of entrance, said entrance being so constructed as to permit an animal to enter a trap and be prevented from escaping therefrom by means of a swinging door which is adapted to normally close said entrance, the trap being thus automatically set at all times.

In carrying out the objects of the invention generally stated above, it will be understood of course, that the essential features thereof are necessarily susceptible to changes in details and structural arrangements, one preferred and practical embodiment being shown in the accompanying drawing wherein:—

Figure 1 is a side elevation of the trap constructed in accordance with the invention. Fig. 2 is a front elevation thereof. Fig. 3 is a fragmentary central vertical longitudinal section. Fig. 4 is a detail perspective view of the entrance for said trap. Fig. 5 is a perspective view of the supporting means for the trap.

Referring more particularly to the accompanying drawings wherein like reference characters designate similar parts, it will be seen that the invention comprises a body 6 which is the usual Mason jar and which is adapted to contain bait. The body 6 is supported and prevented from rolling by means of a single length of wire 7 bent into the form of a loop which is adapted to encircle the open end of said body, said loop being twisted as indicated at 8, the extremities of said loop being extended in opposite directions to form a flat support for the trap.

The closure for the open end of the trap comprises, essentially, the usual form of cover for the jar, said closure 9 being adapted to be threaded onto the body 6 in the usual manner and provided in its periphery with a notch 10 which is adapted to engage the twisted portion 8 of the support when the closure is in place. The closure 9 is provided in its flat surface with a rectangular opening 11 adapted to form an entrance for an animal. A housing 12 for said entrance extends into the body 6 and is provided on its front walls with projecting lugs 13 which are adapted to extend through elongated slots 14 formed in the closure 9 adjacent the opening 11 therein said lugs being adapted to be bent upon said closure in order to securely retain the housing 12 in position. The housing 12 comprises a perforated bottom 15 and side walls 16 which are substantially triangular shape and which have mounted therein adjacent their upper ends a shaft 17 which is adapted to support a swinging door 18 having a plurality of perforations 19 therein. When in a closing position the free end of the door 18 is adapted to rest upon the bottom 15 of the housing. Extending from the rear transverse edge of the bottom 15 is an inclined platform 20, said platform being adapted to cause an animal to slide into the body 6 after raising the door 18.

Stamped from the upper edge of the door 18 immediately of the sides thereof is a locking extension 21 which is bent laterally at its free end as indicated at 22 for a purpose which will be presently described. Projecting laterally from the top of the closure 9 above the door 18 are oppositely disposed wings 23 having alined openings 24 therein, said wings being adapted to receive the extension 21 therebetween when said door is in a closing position. When it is desired to drown the animals caught in the trap it is necessary to close the door 18 so that the same will not swing open when water is poured into the body 6 and this is done by extending a locking pin 25 through the alined openings 24 in the wings 23 so that said pin will engage the bent portion 22 of the locking extension 21 thus preventing any swinging movement of said door. When the locking pin 25 is not in use the same may be held to one side of the closure 9 by means of a projecting supporting lug 26.

It will thus be seen from the foregoing description that the invention contemplates providing a trap which is simple in construction, durable and effective in carrying out the purpose for which it is intended.

Having thus described my invention, what I claim as new is:—

A trap comprising a receptacle having an open end, a closure for said end having an opening therein to form an entrance, a housing for said entrance extending into said receptacle, said housing including a perforated bottom, an inclined perforated door pivotally mounted in said housing and extending inwardly with respect to said receptacle and adapted to normally close said entrance, said door having struck therefrom at its upper end a locking extension, oppositely disposed wings struck from said closure and means engaging said wings and said locking extension for retaining said door in its normal position.

In testimony whereof I affix my signature in presence of two witnesses.

CHARLES HALL.

Witnesses:
 LOUIS HALL,
 OTTO HOFF-JENSSEN.